United States Patent [19]

Mitsuoka

[11] 4,437,045

[45] Mar. 13, 1984

[54] METHOD AND APPARATUS FOR CONTROLLING SERVOMECHANISM BY USE OF MODEL REFERENCE SERVO-CONTROL SYSTEM

[75] Inventor: Toyokazu Mitsuoka, Niiza, Japan

[73] Assignees: Agency of Industrial Science & Technology; Ministry of International Trade and Industry, both of Tokyo, Japan

[21] Appl. No.: 340,966

[22] Filed: Jan. 20, 1982

[51] Int. Cl.³ ............................................. G05B 13/00
[52] U.S. Cl. ..................................... 318/561; 364/148
[58] Field of Search ......................... 318/561; 364/148

[56] References Cited

U.S. PATENT DOCUMENTS

| | | | |
|---|---|---|---|
| 3,758,762 | 9/1973 | Littman et al. | 318/561 X |
| 4,133,011 | 1/1979 | Kurzwell et al. | 318/561 X |
| 4,213,175 | 7/1980 | Kurihara | 318/561 X |
| 4,214,301 | 7/1980 | Kurihara et al. | 318/561 |
| 4,366,422 | 12/1982 | Rhodes | 318/561 X |

Primary Examiner—B. Dobeck
Attorney, Agent, or Firm—Kurt Kelman

[57] ABSTRACT

A method and an apparatus for controlling servomechanism by use of a model reference adaptive system in which adjusting parameters so determined that the difference between the outputs from the final control element and the reference model is eliminated are set. An adaptive control input is produced by multiplying the adjusting parameters respectively by an instruction input, load value and load variation value of the final control element and is given to the final control element together with the instruction input thereby controlling the final control element with high accuracy without being affected even by the load variation.

12 Claims, 4 Drawing Figures

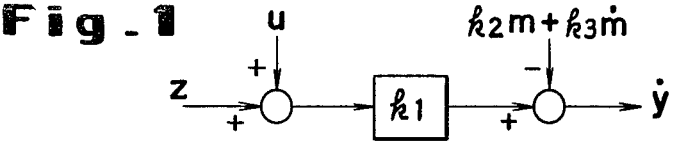
Fig._1
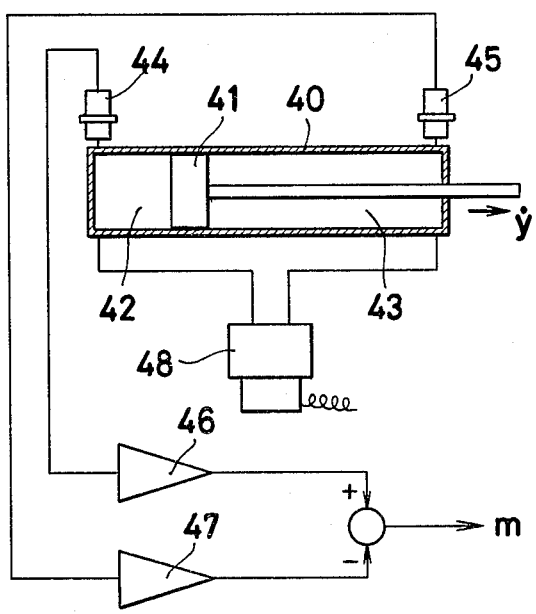
Fig._2
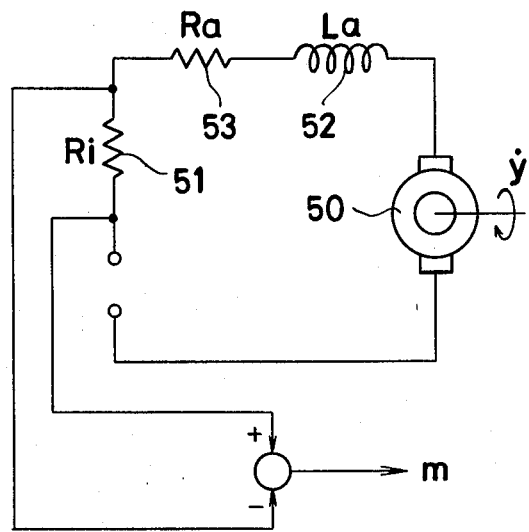
Fig._4
Fig._5

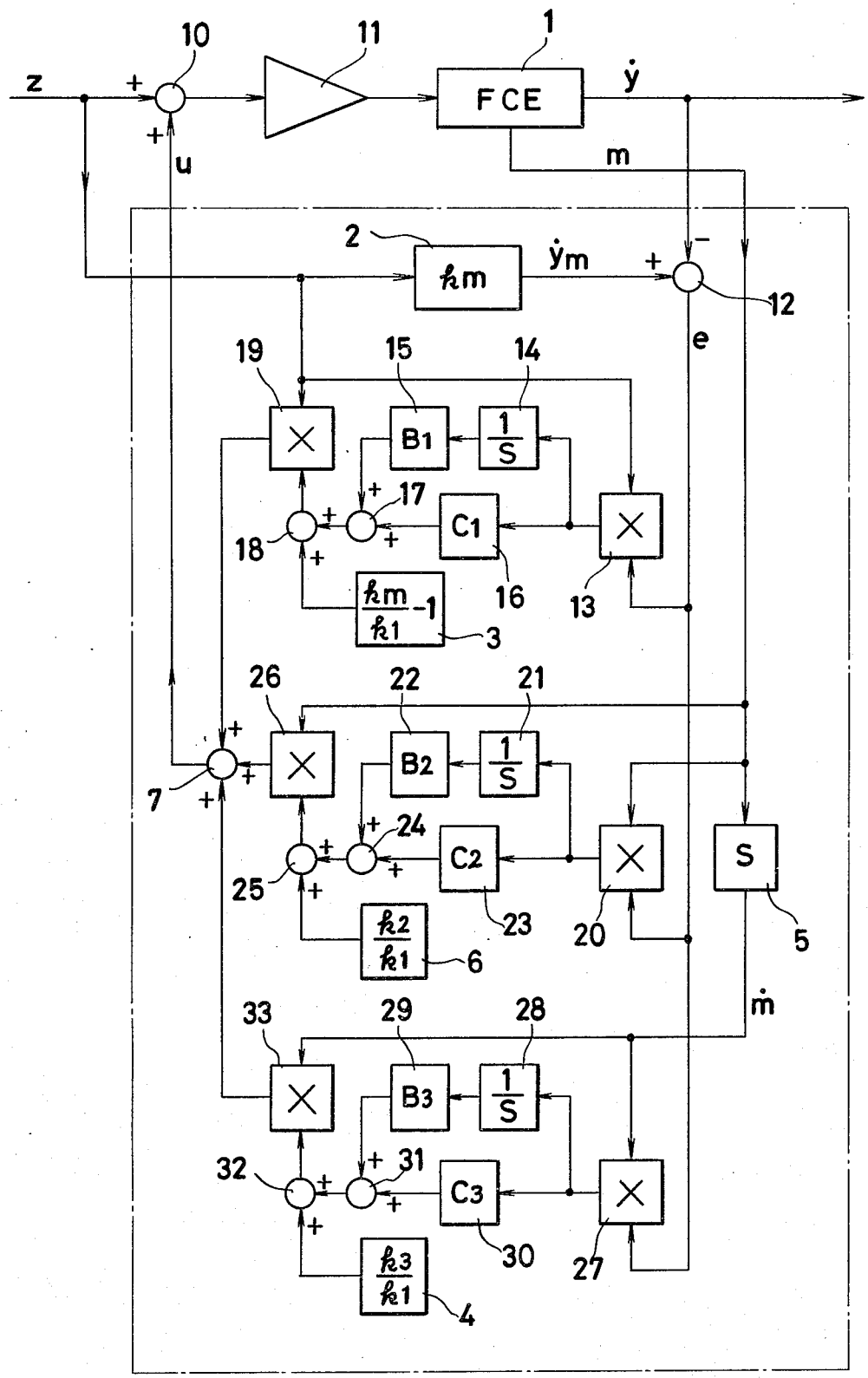
Fig_3

METHOD AND APPARATUS FOR CONTROLLING SERVOMECHANISM BY USE OF MODEL REFERENCE SERVO-CONTROL SYSTEM

BACKGROUND OF THE INVENTION

This invention relates to a method for controlling a servomechanism by using an adaptive compensating circuitry on the basis of a model reference technique and to an apparatus used for practicing this method.

Servomechanisms of all descriptions are actively used in all industrial fields and further improved efficiency thereof is much desired. The current state of the art has, for example, generated needs for improved response characteristics in the high frequency range in material testing machines and extension shaking tables and for enhanced performance and reliability in robots with complicated mechanisms capable of dealing with objects of various weights.

The ordinary servomechanism consists in a servo loop and resorts to a speed-feedback loop as in a tachometer generator or a lead-lag compensating circuit to ensure the reliability and enhance the performance characteristics of the mechanism. Nevertheless, when a servo-motor is subjected to a large fluctuating load and friction or the characteristics thereof are affected by variation in the power supplied to the servomechanism, it becomes difficult for the servo-system to provide the desired smooth response.

Hydraulic servo and pneumatic servo systems employ a control valve with non-linear kinematic characteristics which affect the performance characteristics of the systems in certain working ranges. Therefore, these systems cannot easily and stably ensure the desired damping coefficient in the speed of response.

In recent years, an adaptive control technique for continuously operating a servo system in an appropriate condition by monitoring its working condition and changing the parameters set in compensating circuits in accordance with the variation of the working condition, has been drawing much interest. This technique, however, requires extremely complicated measures for carrying out the processing of signals by use of an electronic computer, and today's computers do not have high enough operation speeds to follow the speed of response of the servomechanism. Moreover, this technique is complicated and expensive to apply. Thus, the development of a low-cost servomechanism capable of operating at high speed in response to the working condition thereof and to variation in load is strongly desired.

SUMMARY OF THE INVENTION

An object of this invention is to provide a method and apparatus for controlling a servomechanism by using a model reference adaptive control system possessed of performance characteristics the same as those of a final control element and adjusting the parameter of the model reference adaptive control system so as to eliminate any possible difference between the outputs from the final control element and the adaptive control systems, whereby the servomechanism enjoys structural simplicity and high responsivity and excels in damping property.

To accomplish the object described above according to the present invention, there is provided a method for controlling a servomechanism by use of a model reference adaptive servo-control system which comprises the steps of multiplying at least one of (a) an instruction input to be given to a final control element, (b) a load value and (c) a load variation value of the final control element by at least one adaptive control coefficient which is so predetermined that the difference between the outputs from a reference model and the final control element is eliminated, thereby producing at least one adjusting coefficient, multiplying said adjusting coefficient by the corresponding one of the instruction input, load value and load variation value thereby obtaining an adaptive control input, and adding said adaptive control input to said instruction input.

In an apparatus for practicing this method, the reference model which is obtained by simulating the load variation property of the final control element such as of the servo motor by means of a computer is set in advance. Servo control of outstanding responsivity and extremely high accuracy can be effected by setting the coefficients for the individual coefficient multipliers so that the difference between the output from the final control element and that from the reference model is eliminated. This servomechanism can be effectively applied not only to electrical servo systems but also to hydraulic servo and pneumatic servo systems. In the mechanical servo systems, the delayed transmission of signals due to the piping system can be compensated for. Thus, such systems can also enjoy outstanding responsivity and simplicity of structure.

The other objects and characteristics of the present invention will become apparent from the further disclosure of the invention to be made hereinafter with reference to the accompanying drawings.

BRIEF EXPLANATION OF THE DRAWING

FIG. 1 is a schematic explanatory diagram of the servomechanism which constitutes the basis of the present invention.

FIG. 2 is a basic block diagram of the servomechanism of the present invention.

FIG. 3 is a specific block diagram of the servomechanism of this invention.

FIGS. 4 and 5 are explanatory diagrams illustrating the application of the present invention respectively to a hydraulic servo system and an electric servo system.

DESCRIPTION OF THE PREFERRED EMBODIMENTS

FIG. 1 is a block circuit diagram for outlining the basic structure of a servomechanism operated to control a final control element (FCE) 1 such as a servo motor. The circuits are formed on the basis of the load compensation formula given below which is derived from the characteristics of FCE.

$$\dot{y} = k_1 \cdot z - (k_2 \cdot m + k_3 \cdot \dot{m}) \quad (1)$$

wherein, $k_1$ stands for the speed gain during no-load working,
$k_2$ for the coefficient of loss in speed per unit load,
$k_3$ for the coefficient of loss in speed per unit rate-of-change in load,
$\dot{y}$ for the output of FCE (the rotational speed of the motor, for example),
m for the load value,
$\dot{m}$ for the variation value in load, and
z for the instruction input.

The losses due to the loads indicated in the second and third terms of the right side of the formula (1) can be eliminated by detecting the loads and applying compensating signals equivalent to the loads to cancel these losses. Consequently, the output (speed) $\dot{y}$ and the input z are constantly proportionated to each other by a fixed coefficient. Thus, the effects of the loads can be eliminated by the application of the adaptive control input u as illustrated in FIG. 1.

This situation can be expressed by the following equation.

$$\dot{y} = k_1 \cdot z - (k_2 \cdot m + k_3 \cdot \dot{m}) + k_1 \cdot u \tag{2}$$

FIG. 2 illustrates the servomechanism of this invention in a schematic block diagram. This diagram represents a servomechanism satisfying the relation of the formula (2) and incorporating a model reference adaptive control. A reference model (parameter: km) 2 is provided parallelly to FCE 1 and possessed of performance characteristic the same as those of FCE 1. In this arrangement, the movement of FCE can be accurately controlled by adjusting the parameter of the reference model 2 so as to eliminate the difference e between the output $\dot{y}$ from FCE 1 and that $\dot{y}m$ from the reference model 2.

The parameter km to be set in reference model 2 can be conceived in the form of a simple integral element which corresponds to the formula (2), thus:

$$\dot{y}m = km \cdot z \tag{3}$$

The difference e, between the output $\dot{y}$ from FCE 1 and the model output $\dot{y}m$ from the reference model is found as follows.

$$e = \dot{y}m - \dot{y} \\ = (km - k_1)z + k_2 \cdot m + k_3 \cdot \dot{m} - k_1 \cdot u \tag{4}$$

To minimize the difference e in the formula (4), therefore, the adaptive control input u is selected as indicated by the following formula.

$$u = K_1(t, e)z + K_2(t, e)m + K_3(t, e)\dot{m} \tag{5}$$

With reference to the circuitry of FIG. 2, the adaptive control input u is obtained by multiplying the instruction input z by $k_1$ in the $k_1$-coefficient circuit 3, multiplying the load of FCE 1 by $k_2$ in the $k_2$-coefficient circuit 6, causing the load variation $\dot{m}$ which multiplying by $k_3$ in the $k_2$-coefficient circuit 4 the load variation value $\dot{m}$ which is obtained as a result of passing the load value m through the differentiator (S) 5, further multiplying the products thus obtained as adjusting parameters $K_1(t,e)$, $K_2(t,e)$ and $K_3(t,e)$ respectively by the corresponding one of the instruction input z, the load value $\dot{m}$ and the load variation value m, and adding the products thus obtained in the adder 7. The differentiator 5 is adapted for compensating for the transient disturbance of the load. The difference between the outputs from FCE and the reference model, which occurs during a variation in the load, can be completely eliminated by adding the adaptive control input u to the reference input z.

The coefficients to be set in the coefficient circuit are determined as indicated below.

The coefficients involved in the formula (5) are fixed as follows.

$$K_i(t, e) = k_i + \Delta K_i(t, e) \tag{6}$$

$(i = 1, 2, 3)$

Then, the formulas (5) and (6) are substituted for the corresponding terms in the formula (4) as follows.

$$e = [km - k_1 - k_1 \cdot K_1 - k_1 \cdot \Delta K_1(t, e)]z \\ + [k_2 - k_1 \cdot K_2 - k_1 \cdot \Delta K_2(t, e)]m \\ + [k_3 - k_1 \cdot K_3 - k_1 \cdot \Delta K_3(t, e)]\dot{m} \tag{7}$$

This equation may be transformed as follows.

$$e = \sum_{i=1}^{3} x_i \cdot g_i \tag{8}$$

wherein, $g_1 = z, \ g_2 = m, \ g_3 = \dot{m}$ $x_1 = km - k_1 - k_1 \cdot K_1 - k_1 \cdot \Delta K_1(t, e)$ $x_2 = k_2 - k_1 \cdot K_2 - k_1 \cdot \Delta K_2(t, e)$ $x_3 = k_3 - k_1 \cdot K_3 - k_1 \cdot \Delta K_3(t, e)$ This can be further transformed into the following equation.

$$\Delta K_i(t, e) = B_i \int_0^t e g_i dt + C_i \cdot e \cdot g_i \tag{9}$$

$(i = 1, 2, 3)$

By substituting this equation for the corresponding term of the formula (6), the following equations are derived.

$$\left. \begin{array}{l} K_1(t, e) = K_1 + B_1 \int_0^t e \cdot z dt + C_1 \cdot e \cdot z \\ \\ K_2(t, e) = K_2 + B_2 \int_0^t e \cdot m dt + C_2 \cdot e \cdot m \\ \\ K_3(t, e) = K_3 + B_3 \int_0^t e \cdot \dot{m} dt + C_3 \cdot e \cdot \dot{m} \end{array} \right\} \tag{10}$$

By varying the adjusting parameter $\Delta K_i(t, e)$ in accordance with the "proportional-plus-integral" rule derivable from formula (9), therefore, the movement of FCE 1 can be stably controlled in conformity with the reference model. This operation can be accomplished by subjecting the output from FCE 1 to integration in the integrator (1/S) 8 provided in the output stage of FCE 1, forwarding the resultant value of integration y to the comparator 9, and subtracting this value from the command input value thereby giving rise to the instruction input 2 z.

In FIG. 2, by 10 is denoted an adder for adding the instruction input z to the adaptive control input u. The sum of this addition is forwarded through an amplifier 11 to FCE 1. 12 denotes a comparator for comparing the output $\dot{y}$ from FCE 1 with the output $\dot{y}m$ from the reference model 2. This comparison serves to find the difference e between the outputs $\dot{y}$ and $\dot{y}m$.

The circuitry illustrated in FIG. 3 represents one embodiment of the servomechanism described above.

The parameters to be set in the circuitry are fixed as shown below, so that total sum of the terms excepting the term $\Delta K_i(t, e)$ in $x_i$ of the formula (8) will become 0.

$$K_1 = km/k_1 - 1$$

$$K_2 = k_2/k_1$$

$$K_3 = k_3/k_1 \qquad (11)$$

In other words, the circuitry is designed so that the parameters $K_1(t,e)$, $K_2(t,e)$, and $K_3(t,e)$ to be given by the formula (1) may be adjusted to eliminate the difference e of the formula (4).

FIG. 3 illustrates one embodiment of the specific combination of the coefficient circuits 3, 4, and 6. It will be described with reference to the individual parameters indicated in the formula (10) in the order mentioned. In this diagram, the items denoted by the same symbols as those of FIG. 2 produce movements equivalent to those of the equivalent items.

In accordance with the formula (10), the adjusting parameter $K_1(t,e)$ is obtained by causing the difference e between the output ẏ from FCE 1 and the model output ẏm from the reference model (km) 2 to be multiplied by the reference input z in the multiplying circuit 13, subjecting the product of the multiplication first to integration in the m integrator (1/S) 14 and then to multiplication by the coefficient $B_1$ in the coefficient multiplier 15, and, at the same time, multiplying the value brought in from the multiplier 13 by the coefficient of adaptive performance $C_1$ in the adaptive performance coefficient circuit 16, causing the two values resulting from the multiplication by the two coefficients $B_1$, $C_1$ to be added to each other in the adder 17, and thereafter adding to the resultant sum in the adder 18 the coefficient $k_1$ $(=km/k_1-1)$ set in the coefficient circuit 3.

The parameter $K_2(t,e)$ is obtained by multiplying the load m of FCE 1 by the difference e in the multiplying circuit 20, subjecting the product of this multiplication first to integration in the integrator (1/S) 21 and then to multiplication by the coefficient $B_2$ in the coefficient circuit 22, and, at the same time, subjecting the value brought in from the multiplier 20 to multiplication by the coefficient of adaptive performance $C_2$ in the adaptive performance coefficient circuit 23, causing the two values resulting from the multiplication by the two coefficients $B_2$, $C_2$ to be added to each other in the adder 25, and thereafter adding to the resultant sum in the adder 25 the coefficient $k_2(=k_2/k_1)$ set in the coefficient circuit 6.

The parameter $K_3(t,e)$ is obtained by causing the load variation ṁ resulting from the differentiation of the load m in the differentiator 5 to be multiplied by the difference e in the multiplying circuit 27, subjecting the product of this multiplication first to integration in the integrator (1/S) 28 and then to multiplication by the coefficient $B_3$ in the coefficient circuit 29, and, at the same time, causing the value brought in from the multiplying circuit 27 to be multiplied by the coefficient of adaptive performance $C_3$ in the adaptive performance coefficient circuit 30, causing the two values of multiplication by the two coefficients $B_3$, $C_3$ to be added to each other in the adder 31, and thereafter adding to the resultant sum in the adder 32 the coefficient $k_3$ $(=k_3/k_1)$ set in the coefficient circuit 4.

The coefficients $B_1$ through $B_3$ and $C_1$ through $C_3$ which are set in the aforementioned coefficient circuits 15, 22, 29, 16, 23 and 30 are arbitrarily determined from among empirically determined values. The larger these coefficients are made, the faster is the operation of the adaptive control. If each coefficient is prescribed as "1", there coefficient circuits are not required. If the coefficient $B_1$ through $B_3$ set in the circuits 15, 22 and 29 are used as a multiplier of the respective integrators 14, 21 and 28, the coefficient circuits 15, 22 and 29 become unnecessary.

From the various parameters obtained as described above is derived the adaptive control input u. This derivation is made in accordance with the formula (5).

To be specific, the adaptive control input u is obtained by causing the parameter $K_1(t,e)$ obtained in the adder 18 to be multiplied by the reference input z in the multiplier 19, the parameter $K_2(t,e)$ obtained in the adder 25 to be multiplied by the load m in the multiplier 26, and the parameter $K_3(t,e)$ obtained in the adder 32 to be multiplied by the load variation ṁ in the multiplier 33 respectively, and thereafter adding the three products of multiplication in the adder 7. This sum is added to the reference input z in the adder 10 provided on the input side of FCE 1. On the basis of the final sum thus obtained, the prescribed operation is executed as already described with reference to FIG. 2.

From the practical point of view, the differentiation of the load m in the differentiator 5 is difficult because of problems such as noise. It is desirable, therefore, to subject the load value m to approximate differentation to obtain the load variation value ṁ.

Where the servomechanism of the operating principle described above is applied to a hydraulic servo system or pneumatic servo system, the load m can be detected by means of the driving pressure or pressure difference in the motor or cylinder. FIG. 4 illustrates the manner in which the detection of the load m is effected. Two chambers 42, 43 which are opposed to each other across a piston 41 in a cylinder constituting a final controlling element (FCE) are provided one each with pressure sensors 44, 45. The pressure detected by the two sensors 44, 45 are amplified by the amplifiers 46, 47 and the load value m is determined on the basis of the products of amplification. With the load value thus obtained, the servo valve 48 is controlled through the medium of the servomechanism mentioned above. In this case, the load m comprises not merely the load applied to the driven object but also the friction, viscosity, inertia, etc. involved in the motor or cylinder and the delay of transmission through the piping system as well. The servo system using such a servomechanism, therefore, enjoys very high responsivity.

Where the servomechanism of the aforementioned operating principle is applied to an electric DC servo system, the load m is derived from the variation in electric current in the motor. Specifically, as illustrated in FIG. 5, the load m is determined from electric potential difference between the both terminals of an external detecting resistance 51. In FIG. 5, 50 denotes a servo motor, 52 a driving coil, and 53 an internal resistance of the motor 50. In this case, the load m comprises not only the external force applied but also the friction, viscosity, inertia, etc. involved in the motor, and the delay due to inductance of the motor as well.

It is clear from the detailed description given above that the model reference adaptive control system offered by the present invention enjoys very high responsivity and operates with a good damping property.

What is claimed is:

1. An apparatus for model reference adaptive servo-control, which comprises in combination:
   a final control element to be driven on the basis of an instruction input and to be controlled by feeding back the output of the final control element to the instruction input;
   a reference model provided with the performance characteristics the same as those of the final control element;
   a detector for detecting a load value and a load variation value of said final control element;
   a comparator for comparing the outputs of said final control element and said reference model thereby obtaining the difference therebetween;
   at least one adaptive control coefficient circuit having stored therein an adaptive control coefficient which is so prescribed that the difference between the outputs of the final control element and reference model is eliminated, and adapted to produce an adjusting parameter by multiplying one of the instruction input, load value and load variation value by said adaptive control coefficient;
   at least one multiplier for multiplying at least one adaptive control coefficient by at least one of the instruction input, load value and load variation value thereby to obtain an adaptive control input; and
   an adder for adding said adaptive control input to said instruction input and feeding these inputs to the final control element.

2. The apparatus for model reference adaptive servo-control according to claim 1, further comprising at least one multiplying circuit for multiplying at least one of the instruction input, load value and load variation value by the difference between the outputs of the final control element and the reference model, at least one adaptive performance coefficient circuit having stored therein a coefficient of adaptive performance and adapted to multiply a product fed from said multiplying circuit by said coefficient of adaptive performance, and at least one other multiplying circuit for producing and outputting to said adder an adjusting parameter by multiplying the sum of the outputs fed from said adaptive performance coefficient circuit and said adaptive control coefficient circuit by the corresponding one of the instruction input, load value and load variation value.

3. The apparatus for model reference adaptive servo-control according to claim 1, further comprising at least one multiplying circuit for multiplying at least one of the instruction input, load value and load variation value by the difference between the outputs of the final control element and reference model, at least one integrator for integrating a product fed from said multiplying circuit according to an integration having predetermined multiplier, and at least one other multiplying circuit for producing and outputting to said adder an adjusting parameter by multiplying the sum of the outputs fed from said adaptive performance coefficient circuit and said adaptive control coefficient circuit by the corresponding one of the instruction input, load value and load variation value.

4. The apparatus for model reference adaptive servo-control according to claim 1, further comprising at least one multiplying circuit for multiplying at least one of the instruction input, load value and load variation value by the difference between the outputs of the final control element and the reference model; at least one adaptive performance coefficient circuit having stored therein a coefficient of adaptive performance and adapted to multiply a product fed from said multiplying circuit by said coefficient of adaptive performance; at least one integrator for integrating the product fed from said multiplying circuit according to an integration having predetermined multiplier; at least one adding circuit for adding the sum of the outputs from said at least one adaptive performance coefficient circuit and said at least one integrator to the corresponding adaptive control coefficient; and at least one other multiplying circuit for producing and outputting to said adder an adjusting parameter by multiplying the sum of the outputs fed from said adaptive performance coefficient circuit and said adaptive control coefficient circuit by the corresponding one of the instruction input, load value and load variation value.

5. An apparatus for model reference adaptive servo-control, comprising in combination:
   a final control element,
   a model system for receiving an instruction input,
   a comparator for comparing the outputs of said final control element and reference model and determining the difference e between the two outputs,
   a first coefficient circuit for receiving said instruction input, processing the reference input in accordance with the following formula, and producing a first adjusting parameter $K_1(t,e)$ as an output, $$K_1(t, e) = K_1 + B_1 \int_0^t e \cdot z \, dt + C_1 \cdot e \cdot z$$

(wherein, $K_1$, $B_1$, and $C_1$ are coefficients),
   a second coefficient circuit for receiving a load value m from said final control element, processing said load value in accordance with the following formula, and producing a second adjusting parameter $K_2(t,e)$ as an output, $$K_2(t, e) = K_2 + B_2 \int_0^t e \cdot m \, dt + C_1 \cdot e \cdot m$$

(wherein, $K_2$, $B_2$, and $C_2$ are coefficients),
   a third coefficient circuit for receiving a load variation value $\dot{m}$ from said final control element, processing said load variation value in accordance with the following formula, and producing a third adjusting parameter $K_3(t,e)$ as an output, $$K_3(t, e) = K_3 + B_3 \int_0^t e \cdot \dot{m} \, dt + C_1 \cdot e \cdot \dot{m}$$

(wherein, $K_3$, $B_3$, and $C_3$ are coefficients),
   an adder for totalling said first, second, and third parameters from said first, second, and third coefficient circuits thereby producing an adaptive control input, and
   an adder for totalling said adaptive control input and said reference input and delivering the resultant sum to said final control element, whereby said first, second, and third adjusting parameters are fixed so as to eliminate the difference between the output from said final control element and that from said reference model.

6. A method for model reference adaptive servo-control for a servomechanism composed of a final control element to be driven on the basis of an instruction input and to be controlled by feeding back the output of the final control element to the instruction input and a reference model provided with performance characteristics the same as those of the final control element, which comprises the steps of:

detecting a load value and a load variation value of said final control element;

multiplying at least one of the instruction input load value and load variation value by the difference between the outputs of the reference model and the final control element so as to eliminate said difference, and multiplying at least one product thus obtained by at least one prescribed coefficient of adaptive performance to obtain at least one adaptive control coefficient;

multiplying said at least one adjusting coefficient by the corresponding one of the instruction input, load value and load variation value thereby to obtain an adaptive control input; and feeding said adaptive control input together with said instruction input to the final control element.

7. A method for model reference adaptive servo-control for a servomechanism composed of a final control element to be driven on the basis of an instruction input and to be controlled by feeding back the output of the final control element to the instruction input and a reference model provided with performance characteristics the same as those of the final control element, which comprises the steps of:

detecting a load value and a load variation value of said final control element;

multiplying at least one of the instruction input load value and load variation value by the difference between the outputs of the reference model and the final control element so as to eliminate said difference, and integrating at least one product thus obtained according to an integration having a predetermined multiplier to obtain at least one adaptive control coefficient;

multiplying said at least one adjusting coefficient by the corresponding one of the instruction input, load value and load variation value thereby to obtain an adaptive control input; and feeding said adaptive control input together with said instruction input to the final control element.

8. A method for model reference adaptive servo-control for a servomechanism composed of a final control element to be driven on the basis of an instruction input and to be controlled by feeding back the output of the final control element to the instruction input and a reference model provided with performance characteristics the same as those of the final control element, which comprises the steps of:

detecting a load value and a load variation value of said final control element;

multiplying at least one of the instruction input load value and load variation value by the difference between the outputs of the reference model and the final control element so as to eliminate said difference thereby obtaining at least one first value, integrating said at least one product according to an integration having a predetermined multiplier thereby obtaining at least one second value, and adding the sum of said first and second values to the corresponding adaptive control coefficient thereby to obtain at least one adjusting coefficient;

multiplying said at least one adjusting coefficient by the corresponding one of the instruction input, load value and load variation value thereby to obtain an adaptive control input; and feeding said adaptive control input together with said instruction input to the final control element.

9. A method for model reference adaptive servo-control for a servomechanism composed of a final control element to be driven on the basis of an instruction input and to be controlled by feeding back the output of the final control element to the instruction input and a reference model provided with performance characteristics the same as those of the final control element, which comprises the steps of:

detecting a load value of said final control element;

subjecting the load value thus detected to approximate differentiation thereby obtaining a load variation value;

multiplying at least one of the instruction input, load value and load variation value by at least one adaptive control coefficient which is so prescribed that the difference between the outputs of the reference model and the final control element is eliminated, thereby to obtain at least one adjusting coefficient;

multiplying said at least one adjusting coefficient by the corresponding one of the instruction input, load value and load variation value thereby to obtain an adaptive control input; and feeding said adaptive control input together with said instruction input to the final control element.

10. A method for model reference adaptive servo-control for a servomechanism composed of a final control element to be driven on the basis of an instruction input and to be controlled by feeding back the output of the final control element to the instruction input and a reference model provided with performance characteristics the same as those of the final control element, which comprises the steps of:

detecting a load value of said final control element;

subjecting the load value thus detected to approximate differentiation thereby obtaining a load variation value;

multiplying at least one of the instruction input, load value and load variation value by the difference between the outputs of the reference model and the final control element so as to eliminate said difference, and multiplying at least one product thus obtained by at least one prescribed coefficient of adaptive performance to obtain at least one adaptive control coefficient;

multiplying said at least one adjusting coefficient by the corresponding one of the instruction input, load value and load variation value thereby to obtain an adaptive control input; and feeding said adaptive control input together with said instruction input to the final control element.

11. A method for model reference adaptive servo-control for a servomechanism composed of a final control element to be driven on the basis of an instruction input and to be controlled by feeding back the output of the final control element to the instruction input and a reference model provided with performance characteristics the same as those of the final control element, which comprises the steps of:

detecting a load value of said final control element;

subjecting the load value thus detected to approximate differentiation thereby obtaining a load variation value;

multiplying at least one of the instruction input, load value and load variation value by the difference between the outputs of the reference model and the final control element so as to eliminate said difference, and integrating at least one product thus obtained according to an integration having a predetermined multiplier to obtain at least one adaptive control coefficient;

multiplying said at least one adjusting coefficient by the corresponding one of the instruction input, load value and load variation value thereby to obtain an adaptive control input; and feeding said adaptive control input together with said instruction input to the final control element.

12. A method for model reference adaptive servo-control for a servomechanism composed of a final control element to be driven on the basis of an instruction input and to be controlled by feeding back the output of the final control element to the instruction input and a reference model provided with performance characteristics the same as those of the final control element, which comprises the steps of:

detecting a load value of said final control element;

subjecting the load value thus detected to approximate differentiation thereby obtaining a load variation value;

multiplying at least one of the instruction input, load value and load variation value by the difference between the outputs of the reference model and the final control element so as to eliminate said difference thereby obtaining at least one product;

multiplying said product thus obtained by at least one prescribed coefficient of adaptive performance thereby obtaining at least one first value, integrating said at least one product according to an integration having a predetermined multiplier thereby obtaining at least one second value; and adding the sum of said first and second values to the corresponding adaptive control coefficient thereby to obtain at least one adjusting coefficient;

multiplying said at least one adjusting coefficient by the corresponding one of the instruction input, load value and load variation value thereby to obtain an adaptive control input; and feeding said adaptive control input together with said instruction input to the final control element.

* * * * *